UNITED STATES PATENT OFFICE.

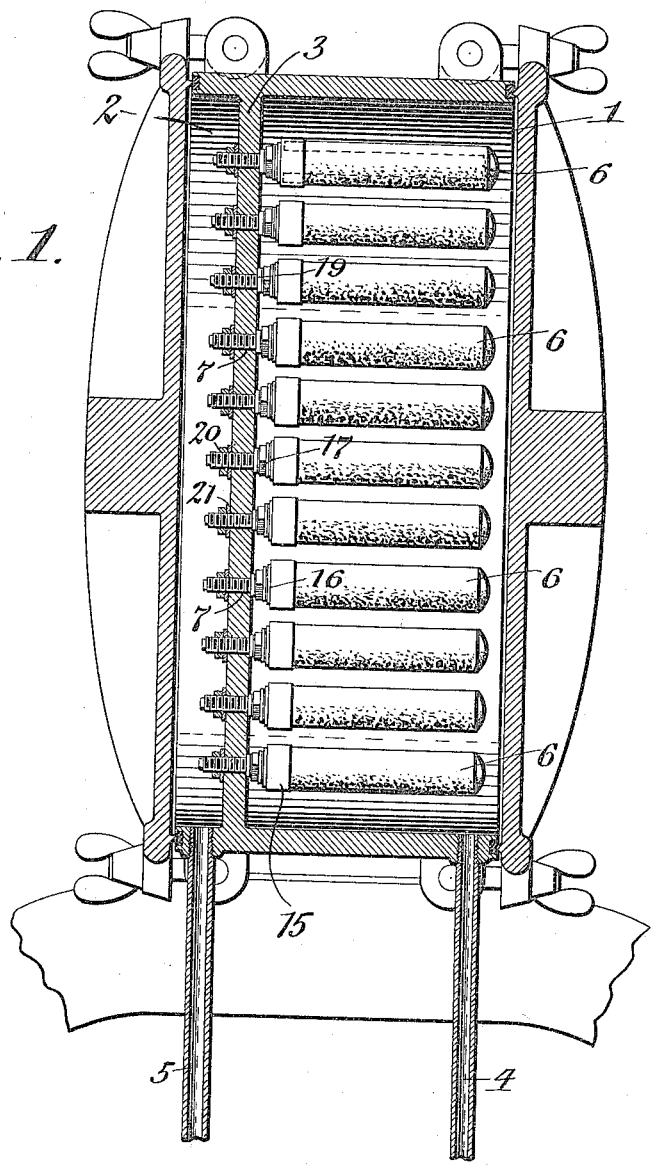

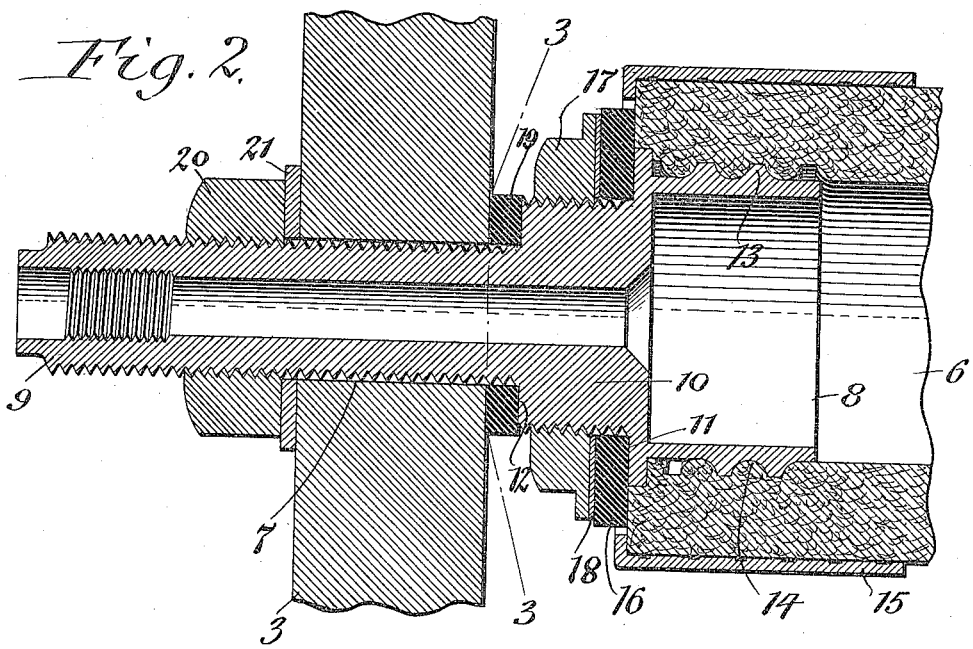
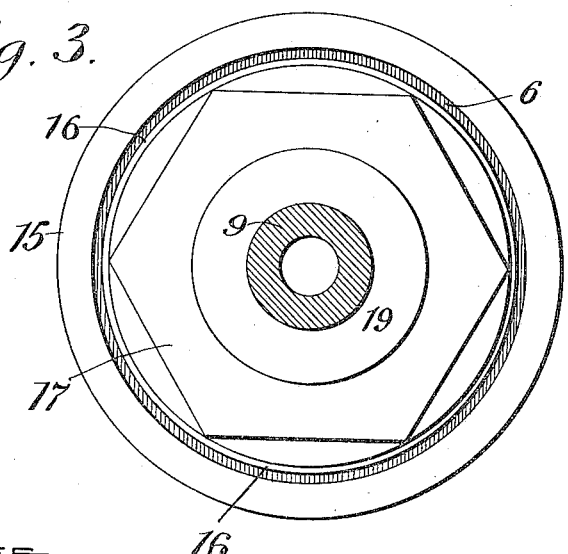

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

FILTER.

1,153,282.   Specification of Letters Patent.   Patented Sept. 14, 1915.

Application filed November 22, 1912, Serial No. 732,923. Renewed March 1, 1915. Serial No. 11,323.

*To all whom it may concern:*

Be it known that I, EDWARD ZAHM, a citizen of the United States, residing at Buffalo, in the county of Erie and State of New York, have invented new and useful Improvements in Filters, of which the following is a specification.

This invention relates to that class of filters in which the filtering area is produced by means of a plurality of porous tubes which are so mounted on a partition arranged between a liquid inlet chamber and a liquid outlet chamber that the unfiltered liquid upon passing from the supply chamber to the delivery chamber is compelled to pass through each of the filter tubes from the outer side to the inner side thereof and thereby separate any solid impurities contained in the liquid and leave these impurities deposited on the outer side of the tube where the same can be brushed off or otherwise removed at suitable intervals. The means heretofore employed for mounting these filter tubes on the partition between the inlet or supply and the outlet or delivery chambers were so constructed that a strain was produced upon the joint between the filter tube and its nozzle which strain was liable to loosen the joint between the same and permit unfiltered liquid to reach the body of filtered liquid so that the latter was contaminated and its quality impaired.

It is the object of this invention to provide a mounting for filter tubes of this character whereby the same may be secured to the partition between the liquid supply and delivery chambers in such manner that a perfectly tight joint is produced between the filter tube and the nozzle and between the nozzle and said partition without liability of loosening the connection between the filter tube and the nozzle so that leakage of unfiltered liquid into the body of filtered liquid is positively prevented.

In the accompanying drawings consisting of 2 sheets, Figure 1 is a vertical longitudinal section of a filter having its filter tubes mounted on the partition between the liquid supply and delivery chambers by mountings constructed in accordance with my invention. Fig. 2 is a fragmentary vertical longitudinal section, on an enlarged scale, showing one of the filter tubes mounted on the partition by means of my improved connection. Fig. 3 is a vertical transverse section taken in line 3—3, Fig. 2.

Similar characters of reference indicate corresponding parts throughout the several views.

Although the general construction of the filter which embodies my invention may be widely varied the same is preferably, though not necessarily, embodied in a filter like that shown in Fig. 1 which comprises an inlet or supply chamber 1 for the unfiltered liquid, an outlet or delivery chamber 2 for the filtered liquid which is separated from the inlet chamber by means of an upright partition 3, a supply pipe 4 for the unfiltered liquid leading to the inlet chamber and delivery pipe 5 for the filtered liquid leading away from the outlet chamber.

6 represents a plurality of filter members each of which is preferably constructed of a porous filtering material in the form of a cylinder which is closed at one end while its opposite end is open. The partition is provided with a plurality of openings 7 extending through the same from the inlet chamber to the outlet chamber and each of these openings receives one of the means whereby one of the filter tubes is mounted upon the partition so that the interior of this tube communicates with the outlet chamber.

My improved means for mounting each filter tube on the partition comprises a tubular nozzle which is preferably constructed of metal so as to form an enlarged circular or cylindrical front head 8 at its inner end, a reduced circular or cylindrical neck 9 at its outer end, and a circular or cylindrical breast 10 of medium size on its central part forming an inner annular shoulder 11 between the inner end of the breast and the outer end of the head, and an annular outer shoulder 12 between the outer end of the breast and the inner end of the neck.

The head at the inner end of the nozzle may be secured to the open end of the filter tube in any suitable manner but preferably by providing the periphery of this head with a screw thread 13 which engages with an internal screw thread 14 formed in the bore of the filter tube adjacent to the open end thereof. The latter is preferably strengthened at its open end by surrounding this part thereof containing the head of the nozzle by means of a ferrule 15 of metal which may be secured to the filter tube by cement or otherwise.

In order to prevent leakage through the joint between the head of the nozzle and the filter tube this joint is sealed by means of a packing or ring 16 of rubber or similar material surrounding the inner part of the breast of the nozzle and extending radially therefrom beyond the annular joint between the periphery of the nozzle head and the bore of the filter tube, and a clamping screw nut 17 arranged on a screw thread formed on the exterior of the breast and bearing by means of an interposed washer 18 against the outer side of the packing ring 16 so that the latter is pressed against the outer end or shoulder of the nozzle head and the outer end of the filter tube. By this means the joint between the nozzle head and the filter tube is effectually sealed and leakage of any unfiltered liquid through this joint from the exterior of the tube to the interior thereof is prevented and contamination of the filtered liquid is avoided.

The neck of each nozzle is arranged within one of the openings of the partition and the same is secured therein so as to produce a tight joint between the nozzle and partition, this being preferably effected by means of a packing or ring 19 constructed of a ring of rubber or other suitable material surrounding the inner end of the nozzle neck and bearing with one of its radial sides against the outer shoulder 12 of the breast and with its other radial side against the adjacent side of the partition, and a clamping screw nut 20 engaging with an external screw thread formed on the neck of the nozzle and bearing by means of an interposed washer 21 against the other side of the partition. Upon tightening this last mentioned screw nut the rubber packing 19 may be drawn against the partition sufficiently firm to produce a perfectly tight joint between the nozzle and the partition and thereby prevent any leakage through this joint from the inlet chamber to the outlet chamber of the filter.

During the operation of filtering the liquid the same passes from the inlet chamber through the several filter tubes from the outer side to the inner side thereof and then through the nozzles thereof into the outlet chamber. Any comparatively solid impurities contained in the liquid are separated therefrom as the liquid passes through the filter tubes and these solids collect on the outer side or periphery of the filter tubes. For the purpose of thoroughly cleaning these filter tubes the same are removed from the partition and the peripheries thereof are thoroughly brushed for removing the accumulated impurities therefrom after which the tubes are again secured to the partition between the inlet and outlet chambers.

Heretofore the pressure applied to the nozzle of the filter tube for securing the same in the partition was in part transmitted to the filter tube itself which was objectionable because of the liability of loosening the joint between the filter tube and the nozzle. In the present construction the tightening of the screw nut for securing the nozzle to the partition of the filter in no wise affects the joint between the nozzle and the filter tube inasmuch as the packing between the nozzle and the filter tube is entirely separate and distinct from the means whereby the nozzle is clamped on the partition. By this means it is impossible for the operator while fitting the filter nozzle on the partition to produce a leaky joint between the filter tube and the nozzle and no particular care need therefore be required on the part of the operator to avoid excess pressure on the nozzle when clamping the same on the partition as has been necessary heretofore. The nozzles can therefore be secured much more tightly in the partition than has been possible heretofore and also much quicker, inasmuch as no particular care need be taken to avoid excessive pressure, thereby enabling the operation of cleaning of the filter to be effected more expeditiously and economically.

I claim as my invention:

A filter comprising a partition or a diaphragm having an opening, a filter tube arranged on one side of said partition, a nozzle having an enlarged head at one end which is secured in said tube, a reduced neck at its opposite end which is arranged in said opening of the partition and a medium sized breast at its central part which forms a shoulder of large diameter between the breast and head and a shoulder of small diameter between the breast and neck, a packing ring engaging with the large shoulder of the nozzle and extending across the joint between the head and filter tube, a clamping screw nut engaging with a thread on the periphery of said breast and bearing against the outer side of said large packing ring, a small packing ring engaging the small shoulder of the nozzle and bearing against the adjacent side of the partition, and a clamping screw nut engaging with a thread on the periphery of said neck and bearing against the opposite side of said partition.

Witness my hand this 20th day of November, 1912.

EDWARD ZAHM.

Witnesses:
 THEO. L. POPP,
 ANNA HEIGIS.